(12) United States Patent
Tietze

(10) Patent No.: US 6,779,562 B2
(45) Date of Patent: Aug. 24, 2004

(54) GAS CONDUIT PIPE

(75) Inventor: Hans-Joachim Tietze, Heubach (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/442,767

(22) Filed: May 20, 2003

(65) Prior Publication Data

US 2003/0230348 A1 Dec. 18, 2003

(30) Foreign Application Priority Data

Jun. 12, 2002 (DE) .................................. 202 09 136

(51) Int. Cl.[7] .............................. F16L 9/00; B60R 21/26
(52) U.S. Cl. ........................... 138/37; 138/39; 280/742
(58) Field of Search .................. 138/37, 39; 280/730.2, 280/742

(56) References Cited

U.S. PATENT DOCUMENTS

| | | | | |
|---|---|---|---|---|
| 253,908 A | * | 2/1882 | Brady | 138/37 |
| 1,109,946 A | * | 9/1914 | Stack | 138/37 X |
| 1,279,739 A | * | 9/1918 | Merrill | 138/37 |
| 1,868,902 A | * | 7/1932 | Jackson | 138/37 X |
| 1,989,163 A | * | 1/1935 | Beck | 138/37 |
| 2,045,669 A | * | 6/1936 | Newton | 138/37 |
| 2,141,797 A | * | 12/1938 | Minella | 138/37 |
| 2,380,839 A | * | 7/1945 | Hand | 138/37 |
| 2,489,141 A | * | 10/1949 | Follo | 138/37 |
| 4,162,546 A | * | 7/1979 | Shortell | 138/37 |
| 4,487,227 A | * | 12/1984 | Meissner | 138/37 |
| 4,729,228 A | * | 3/1988 | Johnsen | 62/510 |
| 6,164,688 A | | 12/2000 | Einsiedel et al. | 280/730.2 |
| 6,325,409 B1 | * | 12/2001 | Fischer | 280/730.2 |
| 6,467,802 B2 | * | 10/2002 | Heigl | 280/729 |
| 2001/0011442 A1 | | 8/2001 | Phin | 52/309.1 |

FOREIGN PATENT DOCUMENTS

| | | | |
|---|---|---|---|
| DE | 29804004 | * | 6/1998 |
| DE | 19812915 | | 9/1999 |
| DE | 19738741 | | 12/1999 |
| DE | 20009237 | | 11/2000 |
| DE | 10003279 | | 8/2001 |
| GB | 2355052 | | 4/2001 |

* cited by examiner

*Primary Examiner*—Patrick Brinson
(74) *Attorney, Agent, or Firm*—Tarolli, Sundheim, Covell & Tummino L.L.P.

(57) ABSTRACT

A gas conduit pipe for a gas bag module, the gas conduit pipe comprising an inflow opening defining a direction of gas flow, a peripheral wall limiting an interior of the pipe, at least one outflow opening arranged in the peripheral wall of the pipe, an edge of the outflow opening being defined by an upstream section and a downstream section of the peripheral wall, which sections both project into the interior of the pipe, the downstream section projecting further into the interior of the pipe than the upstream section.

6 Claims, 1 Drawing Sheet

Fig. 1
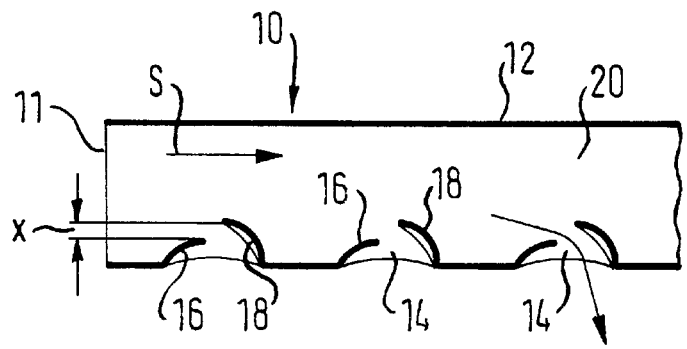
Fig. 2
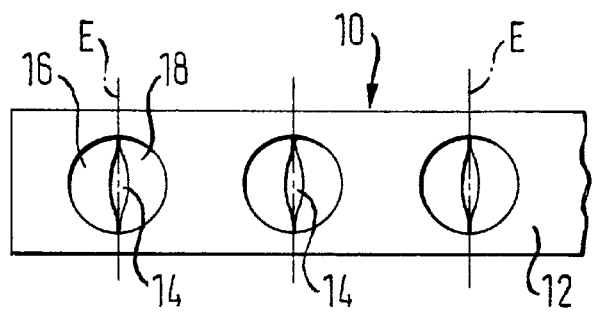
Fig. 3a 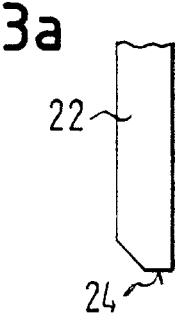 Fig. 4a 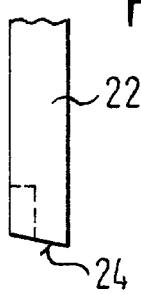
Fig. 3b   Fig. 4b

GAS CONDUIT PIPE

TECHNICAL FIELD

The invention relates to a gas conduit pipe for a gas bag module.

BACKGROUND OF THE INVENTION

A gas conduit pipe usually has at least one outflow opening arranged in a peripheral wall, the edge of the outflow opening being defined by an upstream section and a downstream section of the peripheral wall, which both project into the interior of the pipe.

Such gas conduit pipes, also known as gas lances, serve to direct the gas necessary for inflating a gas bag from a gas generator to the gas bag. The main purpose of use of such gas lances is in side gas bags which have a large area. Here, it is particularly important to fill the gas bag as uniformly as possible from several places, so that the gas bag can unfold quickly. Through the construction of the outflow openings provided in the peripheral wall of the gas lance, the flow of the gas into the gas bag can be increased and thus the inflation time of the gas bag can be shortened.

A construction of the outflow openings by which this can be achieved are what are known as scoop gills (e.g. DE 298 04 004). Here, a portion of the peripheral wall is pressed into the interior of the gas conduit pipe, so that a guide surface is formed for the gas. A disadvantage in this construction is that care must be taken that the gas is highly particle-free, because any particles introduced into the gas lance can be drawn into the gas bag together with the gas stream.

Another embodiment of the outflow openings, which is not so susceptible to the intake of particles into the gas bag, makes provision that the entire edge of the outflow opening is bent into the interior of the pipe. Particles in the gas are largely held back at the projecting wall. Here, of course, the through-flow through the individual outflow openings is distinctly less than with the use of scoop gills, so that means must be provided for the production of a counter pressure in the gas lance, in order to ensure a sufficiently high through-flow.

The invention provides a gas conduit pipe which offers a high through-flow into the gas bag with a low susceptibility to the intake of particles.

BRIEF SUMMARY OF THE INVENTION

According to the invention, a gas conduit pipe for a gas bag module comprises a gas inlet end defining a direction of gas flow, a peripheral wall limiting an interior of the pipe, at least one outflow opening arranged in the peripheral wall of the pipe. An edge of the outflow opening is defined by an upstream section and a downstream section of the peripheral wall. The upstream and downstream sections project both into the interior of the pipe with the downstream section projecting further into the interior of the pipe than the upstream section. This construction of the outflow opening combines the advantages of the scoop gills with the raised-up edge of the outflow opening. The upright upstream section of the peripheral wall, i.e. the section arranged closer to the gas inlet end, prevents an intake of particles into the gas bag, whilst the downstream section, projecting over the upstream section, forms a guide surface for the gas stream in the manner of a scoop gill, and thus increases the gas through-flow into the gas bag.

Particles in the gas are either held back completely in the gas lance, or at least their kinetic energy is reduced to such an extent that they can not damage the gas bag.

Preferably, the downstream section in a longitudinal sectional view of the gas conduit pipe is a concave indentation, when viewed from the exterior, similar to the construction of a scoop gill.

In a preferred embodiment of the invention, the two sections are designed so as to be cohesive, so that the entire edge of the outflow opening projects from the surface of the peripheral wall into the interior of the pipe.

Preferably, the outflow opening is produced in that the peripheral wall is punched to form the two sections and the outflow opening. This can take place advantageously in a simple and quick manner through the use of a tool die, the front region of the tool die being constructed according to the desired shape of the outflow opening. The most favorable shape of the outflow opening or of the tool die can advantageously be determined quickly and at a favorable cost through a simulation. In this way, the gas lance can be coordinated quickly, simply and at a favorable cost to the requirements needed for the respective use. The sections preferably run in a half ring shape and continue into each other in a plane lying at right angles to the direction of gas flow. The half closer to the inflow opening into the pipe is the upstream section; the other half is the downstream section.

BRIEF DESCRIPTION OF THE DRAWINGS

FIG. 1 shows a diagrammatic section through a gas conduit pipe according to the invention;

FIG. 2 shows a diagrammatic top view onto the gas conduit pipe of FIG. 1; and

FIGS. 3a, b and 4a, b show diagrammatic views of two tool dies for the formation of the outflow openings of a gas lance according to the invention, from the side and in top view, respectively.

DETAILED DESCRIPTION OF THE PREFERRED EMBODIMENTS

FIG. 1 shows a gas conduit pipe 10 with an inflow opening 11 and a peripheral wall 12, in which several outflow openings 14 are formed which are spaced apart from each other. Gas from a compressed gas source which is not shown flows with the direction of gas flow S through the gas conduit pipe 10 and out from the outflow openings 14 into a gas bag, which is not shown either.

Each of the outflow openings 14 has at its edge an upstream section 16 and a downstream section 18. Both sections 16, 18 of the edge of the outflow opening 14 continue into each other and project into the interior 20 of the gas conduit pipe 10. The transition of the sections 16, 18 takes place in a plane E lying perpendicular to the direction of flow S, which corresponds to the central axis of the pipe on the outflow opening 14. The downstream section 18 projects over the upstream section 16 by an amount x, so that a gap is formed through which the gas flows out from the outflow opening 14 (see arrow in FIG. 1). The downstream section 18, similar to the shape of a scoop gill, is concave in longitudinal section, so that it forms a guide surface for the gas.

As indicated in FIG. 2, the entire edge of the outflow opening 14 projects into the interior of the pipe 20. Any particles in the gas are either held back completely in the gas conduit pipe 10 by the edge of the outflow openings 14 projecting into the pipe interior 20, in particular from the upstream section 16, here in a convex shape, or they are reduced in their kinetic energy. The downstream section 18, constructed as a guide surface, brings about an introduction of gas into the gas bag, so that despite the edges of the outflow openings 14 projecting into the interior of the pipe, the production of a counter pressure in the gas conduit pipe 10 can be dispensed with for rapid filling of the gas bag.

In the embodiment shown here, the outflow openings 14 are formed in that the peripheral wall 12 is punched inwards by a tool die 22. FIGS. 3a to 4b show two possible constructions of such a die 22. The tool die 22 shown in FIG. 3a and 3b has a round cross-section and has on the end face 24 a chamfer which takes up half the end face. The tool die 22 shown in FIGS. 4a and 4b has a sector-shaped recess which extends to a predetermined depth. Through the construction of the end faces 24 of the tool die 22, and of the front section of the tool die 22 adjoining thereto, the construction of the outflow openings 13 and of the two sections 16, 18 can be established in a simple manner. In particular, the size x of the gap can be set to specific dimensions.

What is claimed is:

1. A vehicle occupant protection apparatus for helping to protect an occupant of a vehicle, said apparatus comprising:

a gas bag inflatable along a side structure of the vehicle between the occupant and the side structure, and a gas conduit pipe for inflating said gas bag, said gas conduit pipe comprising an inflow opening defining a direction of gas flow, a peripheral wall defining an interior of said pipe, at least one outflow opening arranged in said peripheral wall of said pipe in communication with an interior of said gas bag, an edge of said outflow opening being defined by an upstream section and a downstream section of said peripheral wall, which sections both project into said interior of said pipe, said downstream section projecting further into said interior of said pipe than said upstream section, said downstream section, when viewed from the exterior of the pipe, having the shape of a scoop gill, said scoop gill forming a guide surface for catching and guiding a gas flow stream to increase gas flow through said outflow opening into the interior of said gas bag.

2. The apparatus according to claim 1, wherein said downstream section, seen in a longitudinal sectional view of said gas conduit pipe and viewed from an exterior of said pipe, is a concave indentation.

3. The apparatus according to claim 1, wherein said upstream and downstream sections are arranged immediately adjacent to each other.

4. The apparatus according to claim 1, wherein said peripheral wall is punched to form said upstream and downstream sections and said outflow opening.

5. The apparatus according to claim 1, wherein said upstream section has a convex shape and said downstream section has a concave shape, as viewed along a longitudinal section in the direction of gas flow, and said upstream and downstream sections being continuous with each other in a plane perpendicular to said direction of gas flow.

6. A vehicle occupant protection apparatus for helping to protect an occupant of a vehicle, said apparatus comprising:

a gas bag inflatable along a side structure of the vehicle between the occupant and the side structure, and a gas conduit pipe for inflating said gas bag, said gas conduit pipe comprising an inflow opening defining a direction of gas flow, a peripheral wall defining an interior of said pipe, at least one outflow opening arranged in said peripheral wall of said pipe in communication with an interior of said gas bag, an edge of said outflow opening being defined by an upstream section and a downstream section of said peripheral wall, both said upstream and downstream sections being formed in one piece with the,peripheral wall, which sections both project into said interior of said pipe, said downstream section projecting further into said interior of said pipe than said upstream section, said down section, when viewed from the exterior of the pipe, having a shape of a scoop gill, said scoop gill forming a guide surface for catching and guiding a gas flow stream to increase gas flow through said outflow opening into the interior of said gas bag.

* * * * *